United States Patent Office 2,977,354
Patented Mar. 28, 1961

2,977,354
MONOSULPHONATED DI-ORTHO-HYDROXY-AZO DYESTUFFS

Rene Eugene Marcel Gangneux, Rouen, France, assignor to Compagnie Francaise des Matieres Colorantes, Paris, France, a French body corporate No Drawing. Filed Jan. 3, 1957, Ser. No. 632,273
Claims priority, application France Jan. 4, 1956
1 Claim. (Cl. 260—195)

The present invention concerns improvements in and relating to monosulphonated di-ortho-hydroxy-azo dyestuffs.

The product resulting from the coupling of the diazo compound of 1-amino-2-naphthol-4-sulphonic acid with β-naphthol has been known for many years and may be considered as one of the more important among the chromium dyestuffs at present used for the production of black shades. The difficulties inititally encountered in the diazotisation of 1-amino-2-naphthol-4-sulphonic acid led those who first prepared this dyestuff to use special methods of diazotisation or of preparation of the dyestuff itself.

German Patents Nos. 156,440, 157,325 and 160,536 used as the diazotisable base 1-amino-naphthalene-2:4-disulphonic acid, the diazo compound of which is converted into the diazo derivative of 1-amino-2-naphthol-4-sulphonic acid by a simple treatment, by reason of the lability of the sulphonic group in the 2 position. In German Patent No. 181,714, 1-amino-2-naphthol-4-sulphonic acid is acetylated, the 1-amino-2-acetoxy-naphthalene-4-sulphonic acid is diazotised, and the dyestuff obtained after coupling with β-naphthol is saponified. In both cases relatively complicated processes for the preparation of a simple dyestuff are concerned.

German Patents Nos. 171,024 and 175,593 have revealed the possibility of preparing the diazo-oxide of 1-amino-2-naphthol-4-sulphonic acid by operating respectively in the presence of copper or zinc salts and, finally, German Patent No. 188,645 has described the preparation of the zinc salt of the dyestuff. It is in this form that the dyestuff has always been prepared up to now by the various dyestuff manufacturing companies, excluding certain products put on the market in the form of the monosodium salt which are not soluble enough to be really interesting to the users.

The progress realised in the field of dyeing, and the development of Vigoureux printing have gradually led the users to work with dyestuffs which are diluted as little as possible and having maximum solubility. This has led to frequent modifications of the conditions of preparation of the dyestuff.

It is known moreover that the dyestuff resulting from the coupling of the diazo compound of 1-amino-2-naphthol-4-sulphonic acid with β-naphthol, as also that obtained with α-naphthol, is used in admixture with other metallisable or no-metallisable azo dyestuffs. In many cases, by reason of the very fact that the base dyestuff is a zinc salt, the mixtures obtained have a poor solubility which necessarily limits their uses.

It has now been found that, quite generally, the di-alkali metal salts of monosulphonated di-ortho-hydroxy azo dyestuffs, of which the two dyestuffs mentioned above only represent particular cases, offer an advantage greater than that of the majority of the dyestuffs at present on the market owing to their excellent solubility. This solubility allows them to be used for dyeing in apparatus, including dyeing under pressure, as well as for Vigoureux printing or for the preparation of mixtures of dyestuffs.

Given the high concentration desirable, there could be no question of obtaining these di-alkali metal salts by diluting by means of suitable non-foaming alkaline substances or by salting out of concentrated solutions of the di-alkyl metal salts. Consequently, only treatment with a caustic alkali of the dyestuff isolated either as the free acid or as the monoalkali metal salt, is capable of leading to the di-alkali metal salt.

Nevertheless, it is well known that the di-ortho-hydroxy azo dyestuffs are relatively unstable in an alkaline medium and withstand the drying, which is essential for obtaining the finished products, relatively badly. It has now been found however, that, provided the drying is carried out very quickly, it is possible to obtain, without appreciable decomposition, products of a very high degree of purity and to do this on an industrial scale. Among the many processes which can be used there may be mentioned continuous drying on belts, drum drying, and drying by atomisation.

The following examples illustrate the invention without restricting it, either from the point of view of the conditions of preparation of the di-alkali metal salts of the monosulphonated di-ortho-hydroxy azo dyestuffs, or from the point of view of the conditions of drying: the parts indicated are parts by weight.

Example 1

144 parts of β-naphthol are dissolved in 275 parts of water at 45° C. by means of 40 parts of 100% caustic soda. A neutral paste prepared with 272 parts of the monosodium salt of the diazo compound of 1-amino-2-naphthol-4-sulphonic acid and 450 parts of water is then introduced over a few minutes, while keeping the temperature at 45° C. The dyestuff rapidly forms and the coupling operation is finished in approximately two hours. dilution and neutralisation until a slightly alkaline reaction is produced, the dyestuff obtained is isolated by filtration.

The paste obtained is gradually added to 100 parts of cold water simultaneously with a solution of 40 parts of caustic soda in 100 parts of water, so that for the total addition of dyestuff there corresponds an addition of the chemically equivalent quantity of caustic soda. As soon as it is homegeneous, the fluid paste so obtained is dried in an atomiser without special precautions. The product obtained is in the form of a deep blue powder which gives a pure blue solution with water; it corresponds to the disodium salt of the dyestuff resulting from the coupling of the diazo compound of 1-amino-2-naphthol-4-sulphonic acid with β-naphthol.

Example 2

174 parts of 1-phenyl-3-methyl-5-pyrazolone are dissolved in 500 parts of water at ordinary temperature with the aid of 40 parts of 100% caustic soda. A neutral paste prepared with 272 parts of the monosodium salt of the diazo compound of 1-amino-2-naphthol-4-sulphonic acid and 450 parts of water is then introduced over a few minutes. The coupling is very rapid and the product obtained can be dried directly in an atomiser. It is in the form of a brown powder which gives an orange brown solution with water: if it is used to dye wool, after treatment with dichromate, it enables a bluish red shade to be obtained having the same shade and the same properties as that obtained on using the dyestuff prepared according to a conventional method.

I claim:

The process for the preparation of a dry, stable dyestuff having the following formula:

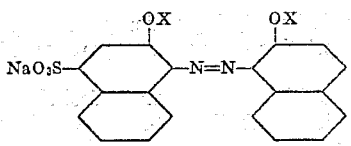

in which one X is an atom of hydrogen and the other X is an atom of sodium, comprising the step of diazotising 1-amino 2-naphthol 4-sulfonic acid, coupling the diazo-derivative obtained with beta-naphthol to form a dyestuff, reacting the said dyestuff with a chemically equivalent amount of sodium hydroxide and spray-drying the product thus obtained in an atomiser.

References Cited in the file of this patent

UNITED STATES PATENTS

| | | |
|---|---|---|
| 778,476 | Elbel | Dec. 27, 1904 |
| 1,014,114 | Boniger | Jan. 9, 1912 |
| 1,023,199 | Elbel | Apr. 16, 1912 |
| 1,026,257 | Elbel | May 14, 1912 |
| 1,624,637 | Straub et al. | Apr. 12, 1927 |
| 1,704,637 | Straub | Mar. 5, 1929 |
| 1,995,564 | Clingestein et al. | Mar. 26, 1935 |
| 2,015,429 | Kracker et al. | Sept. 24, 1935 |
| 2,071,492 | Boehmer | Feb. 23, 1937 |
| 2,203,818 | Fleischhauer et al. | June 11, 1940 |
| 2,384,734 | Felix et al. | Sept. 11, 1945 |
| 2,574,597 | Salvin et al. | Nov. 13, 1951 |
| 2,715,120 | Ruegg | Aug. 9, 1955 |
| 2,756,225 | Frisch | July 24, 1956 |
| 2,812,321 | Eberhart et al. | Nov. 5, 1957 |
| 2,819,258 | Schmid | Jan. 7, 1958 |

FOREIGN PATENTS

| | | |
|---|---|---|
| 10,022 | Great Britain | of 1905 |
| 165,743 | Germany | Dec. 13, 1905 |
| 1,086,016 | France | Aug. 4, 1954 |